United States Patent
Dwars et al.

(10) Patent No.: US 11,537,609 B2
(45) Date of Patent: Dec. 27, 2022

(54) TRANSFORMING A FUNCTION-STEP-BASED GRAPH QUERY TO ANOTHER GRAPH QUERY LANGUAGE

(71) Applicant: Oracle International Corporation

(72) Inventors: Martijn Dwars, Zurich (CH); Martin Sevenich, Palo Alto, CA (US); Sungpack Hong, Palo Alto, CA (US); Guido Wachsmuth, Zurich (CH); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 159 days.

(21) Appl. No.: 16/917,621

(22) Filed: Jun. 30, 2020

(65) Prior Publication Data
US 2021/0406265 A1    Dec. 30, 2021

(51) Int. Cl.
| G06F 16/2455 | (2019.01) |
| G06F 16/2453 | (2019.01) |
| G06F 16/901  | (2019.01) |
| G06F 16/248  | (2019.01) |

(52) U.S. Cl.
CPC ...... *G06F 16/24534* (2019.01); *G06F 16/248* (2019.01); *G06F 16/2455* (2019.01); *G06F 16/9024* (2019.01)

(58) Field of Classification Search
CPC .......... G06F 16/24534; G06F 16/2455; G06F 16/248; G06F 16/9024
USPC ...................................................... 707/759
See application file for complete search history.

(56) References Cited

U.S. PATENT DOCUMENTS

| 7,844,601 | B2 * | 11/2010 | Seeds ............... G06F 16/20 707/758 |
| 8,321,404 | B1 * | 11/2012 | Mysen .............. G06F 16/3322 707/723 |
| 8,812,541 | B2 * | 8/2014 | Ismalon ............ G06F 16/40 707/765 |
| 9,256,641 | B1 * | 2/2016 | Zlatnik ............. G06F 16/2453 |
| 9,294,558 | B1 * | 3/2016 | Vincent ............ H04L 67/1004 |
| 9,405,855 | B2 * | 8/2016 | Vasilyeva ........ G06F 16/90335 |
| 9,449,008 | B1 * | 9/2016 | Oikarinen ........ G06F 16/211 |
| 9,495,478 | B2 * | 11/2016 | Hendrickson ..... G06F 16/137 |

(Continued)

OTHER PUBLICATIONS www.github.com, "Turorials: Overview", http://www.gwtproject.org/doc/latest/tutorial/index.html, last viewed on Jun. 30, 2020, 3 pages.

(Continued)

Primary Examiner — Hanh B Thai
(74) Attorney, Agent, or Firm — Hickman Becker Bingham Ledesma LLP (57) ABSTRACT

To execute function-step-based graph queries on a graph engine that has its own graph query language, rather than re-implementing an existing infrastructure to support function-step-based graph protocols, function-step-based graph queries are transformed to the graph query language that is understood by the graph engine. The existing infrastructure computes the results of the transformed queries. Result sets are then transformed to function-based-based result sets, which are returned to customers. In this manner, the graph engine supports function-step-based graph query workloads without implementation of the function-step-based graph protocol.

20 Claims, 4 Drawing Sheets

300

305
Receiving a first graph query associated with a source query language

310
Transforming the first graph query to a second graph query associated with a target query language (56) References Cited

U.S. PATENT DOCUMENTS

| | | | | |
|---|---|---|---|---|
| 9,639,575 | B2* | 5/2017 | Leida | G06F 16/2452 |
| 10,223,417 | B1* | 3/2019 | Sirin | G06F 16/24542 |
| 10,303,688 | B1* | 5/2019 | Sirin | G06F 16/2458 |
| 10,409,560 | B1* | 9/2019 | Bebee | G06F 8/4441 |
| 10,474,718 | B1* | 11/2019 | Jesurum | G06F 16/86 |
| 10,956,566 | B2* | 3/2021 | Shu | G06F 21/554 |
| 11,093,498 | B2* | 8/2021 | Sirin | G06N 5/003 |
| 2003/0203370 | A1* | 10/2003 | Yakhini | G16B 30/00 435/6.12 |
| 2004/0260691 | A1* | 12/2004 | Desai | G06F 16/3332 707/E17.127 |
| 2005/0289125 | A1* | 12/2005 | Liu | G06F 16/24526 |
| 2013/0124574 | A1* | 5/2013 | Brettin | G06F 16/9024 707/798 |
| 2013/0262443 | A1* | 10/2013 | Leida | G06F 16/24534 707/E17.014 |
| 2014/0351281 | A1* | 11/2014 | Tunstall-Pedoe | G06N 5/02 707/760 |
| 2015/0074102 | A1* | 3/2015 | Ismalon | G06F 16/242 707/734 |
| 2015/0278397 | A1* | 10/2015 | Hendrickson | G06F 16/137 707/798 |
| 2018/0121501 | A1* | 5/2018 | Vaquero Gonzalez | G06F 16/284 |
| 2019/0258632 | A1* | 8/2019 | Pal | G06F 16/24542 |
| 2019/0272271 | A1* | 9/2019 | Bhattacharjee | G06F 16/24554 |
| 2019/0310977 | A1* | 10/2019 | Pal | G06F 16/2455 |
| 2019/0384766 | A1* | 12/2019 | Sirin | G06F 16/9024 |
| 2019/0384863 | A1* | 12/2019 | Sirin | G06K 9/6262 |
| 2019/0391791 | A1* | 12/2019 | Bebee | G06F 8/4441 |
| 2020/0065077 | A1* | 2/2020 | Inagaki | G06F 11/3006 |
| 2020/0201989 | A1* | 6/2020 | Shu | G06F 16/9024 |
| 2022/0050666 | A1* | 2/2022 | Bebee | G06F 8/4441 |

OTHER PUBLICATIONS

PGQL, "Property Graph Query Language", Graph Pattern Matching for SQL and NoSQL,, http://pgql-lang.org/, last viewed on Jun. 30, 2020, 5 pages.

Opencypher, "Cypher Traversal Source", https://github.com/opencypher/cypher-for-gremlin/tree/master/tinkerpop/cypher-gremlin-server-client, last viewed on Jun. 30, 2020, 5 pages.

Babel, "Babel 7.10.0", https://babeljs.io/, last viewed on Jun. 30, 2020, 3 pages.

Apache TinkerPop, "The Germlin Graph Traversal Machine and Language", https://tinkerpop.apache.org/gremlin.html, last viewed on Jun. 30, 2020, 6 pages.

Apache Tinker Pop, "TinkerPop 3.4.7 Downloads", https://tinkerpop.apache.org/, dated Jun. 1, 2020, 6 pages.

* cited by examiner

305 Receiving a first graph query associated with a source query language

310 Transforming the first graph query to a second graph query associated with a target query language

355 Processing a particular function step that is being traversed

360 In response to processing the particular function step, expanding the second graph query by adding at least one target query language element from a plurality of target query language elements that corresponds to the particular function step, in a construct of the plurality of constructs

TRANSFORMING A FUNCTION-STEP-BASED GRAPH QUERY TO ANOTHER GRAPH QUERY LANGUAGE

FIELD OF THE INVENTION

The present invention relates to the field of graph searches and, in particular, to transforming a query from a source language to another target language to compute a result by a graph engine that uses the target language to query graphs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graph analysis is an important emerging workload area. Graph analysis is used to extract valuable information from large graph instances. Many graph engines come with their own graph query language. For example, Apache Tinkerpop uses Gremlin as its query language, whereas Oracle Parallel Graph AnalytiX (PGX) uses PGQL as its query language.

Companies that wish to migrate from one graph engine to another, such as Apache Tinkerpop to Oracle PGX, would need to change Gremlin queries to PGQL queries. One solution to avoid changing Gremlin queries to PGQL queries, is by using an existing PGX graph engine to support the Gremlin protocol. However, this solution requires re-implementing an interpreter and an optimizer for the Gremlin protocol, that would sit on top of the existing PGX graph engine. Developing and maintaining a separate interpreter and optimizer is not only time and resource intensive but is also wasteful as existing PGQL infrastructure is not used.

Therefore, there is a need for solution that supports the Gremlin protocol to the PGX graph engine without requiring customers to rewrite their graph queries.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Different graph engines use different languages to query graphs. For example, Apache Tinkerpop is a graph engine that uses Gremlin to query graphs. Oracle Parallel Graph AnalytiX (PGX) is another graph engine that uses the Property Graph Query Language (PGQL) to query graphs. To execute Gremlin queries on PGX, rather than re-implementing the PGX infrastructure to support the Gremlin protocol as in the discussed solutions above, techniques described herein automatically transforms Gremlin queries to PGQL queries and automatically transforms PGQL result sets back to Gremlin result sets. In this manner, PGX supports Gremlin workloads without implementing the Gremlin protocol.

In an embodiment, a full execution of a Gremlin query begins with a Gremlin query being received at a PGX server. The PGX server transforms the Gremlin query into a PGQL query. The existing PGX infrastructure is used to compute a result of the PGQL query. The result of the PGQL query is translated into a Gremlin result set. The Gremlin result set may then be returned to a customer.

Techniques described herein provide a solution which allows customers who use a Gremlin-enabled graph engine to migrate to PGX without having to rewrite Gremlin queries. The techniques described pertain to a subset of Gremlin traversals that include any of the following Gremlin steps:

| | | |
|---|---|---|
| And | Graph | Id |
| Constant | Group | Identity |
| Count | GroupCount | Is |
| Dedup | Has | Label |
| Limit | Not | Skip |
| Match | Or | Sum |
| Math | Order | Vertex |
| Max | Project | Where |
| Mean | Range | |
| Min | Select | |

Graph Pattern Matching Overview

A graph is a mathematical structure used to model relationships between entities. A graph consists of a set of vertices (corresponding to nodes) and a set of edges (corresponding to relationships). When data for a specific application has many relevant relationships, the data may be represented by a graph.

Figure 1:
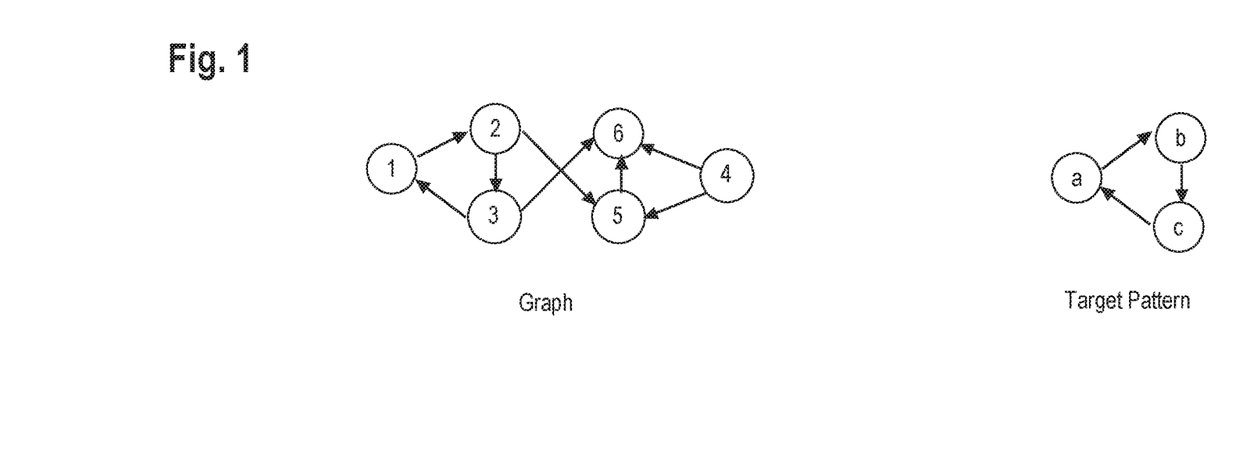
FIG. 1 illustrates an example graph and an example target pattern.

Graph pattern matching refers to finding subgraphs, in a given graph, that are homomorphic to a target pattern. FIG. 1 illustrates an example graph and an example target pattern. If the target pattern is (a)→(b)→(c)→(a), then corresponding graph walks or paths of FIG. 1 are the following:
(1)→(2)→(3)→(1),
(2)→(3)→(1)→(2), and
(3)→(1)→(2)→(3).

Translation from Relational Model to Property Graph Model

A property graph data model allows vertices and edges in a graph to have labels to group or categorize them. Each vertex and each edge may be labeled with any number of labels, including none. A property graph data model also allows vertices and edges in a graph to have arbitrary properties as key-value pairs.

Figure 2A:
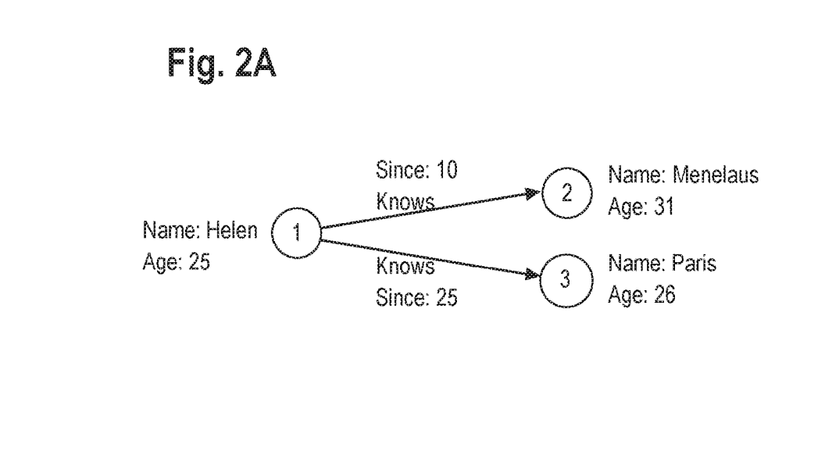
FIG. 2A illustrates an example property graph.

FIG. 2A illustrates an example property graph. The property graph in FIG. 2A represents contact relationships between persons. Each vertex in the graph is a vertex labeled "person," and each edge in the graph is an edge labeled "knows." The persons have name and age properties, while the relationships have a property indicting the age at which the subject knew the other person.

Figure 2B:
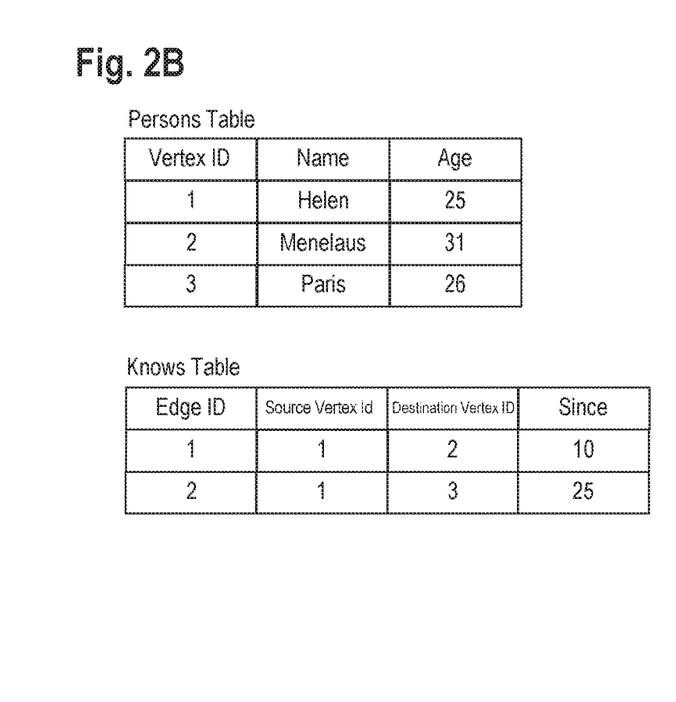
FIG. 2B illustrates example tables associated with the graph of FIG. 2A.

Conceptually, a relational DBMS may be interpreted in a graph model. For example, all vertices and their properties may be grouped in a vertex table, while all relationships and their properties may be grouped in an edge table. As an example, the graph illustrated in FIG. 2A may be stored in a RDBMS as tables, as illustrated FIG. 2B. Each vertex has a unique identifier (i.e., Vertex id) in the vertex table (i.e., Persons Table) where it is stored. Similarly, each edge has a unique identifier (i.e., Edge id) in the edge table (i.e., Knows Table) where it is stored. The edge table can be used for matching patterns; the vertex and edge tables can then be used for accessing the desired information when the pattern is matched. The RDBMS keeps track of the referenced tables by each edge table, in order to be able to reconstruct the graph structure.

Gremlin Overview

Gremlin is a graph traversal language. A Gremlin query (which is also referred to herein as Gremlin traversal) is a chain of operations or functions that are traversed and evaluated from left to right.

A Gremlin traversal is composed of a sequence of steps. Each step is denoted by a separating dot. Each step performs an atomic operation or function on a data stream that includes one or more objects emitted or output from a previous step. For example, a step may filter the data or transform the data. Some steps may be parameterized with another sequence of steps. A similar concept in PGQL is a query that includes SQL constructs such as SELECT, WHERE, GROUP BY, ORDER BY, and MATCH.

Table 1 shows, on the left, an example Gremlin traversal and, on the right, a corresponding equivalent PGQL query.

TABLE 1

| g | SELECT v |
| .V( ) | MATCH(v) |
| .has('name', 'John') | WHERE v.name = 'John' |

The example Gremlin traversal shown in Table 1 can be read:
Step 1. g: for the current graph traversal.
Step 2. V: for all vertices in the graph
Step 3. has('name', 'John'): filters the vertices down to those with name property "John."
The PGQL query shown in Table 1 also computes the vertices whose name is John.

Transformation Overview: Gremlin to PGQL

In an embodiment, an input to a transformation process is Gremlin bytecode. The transformation builds an abstract syntax tree (AST) of the PGQL query and outputs the AST to form a human-readable PGQL query. In an embodiment, the transformation process may include a preprocessing phase, translation phase, and postprocessing phase, which are discussed in detail below.

Briefly, the translation phase starts with an empty PGQL query, which is expanded as steps of a Gremlin traversal are processed. In some cases, translation of a Gremlin step depends on the steps that precedes it, which is illustrated in the example shown in Table 2. Table 2 shows, on the left, an example Gremlin traversal and, on the right, a corresponding equivalent PGQL query on the right.

TABLE 2

| g | SELECT SUM(v0.age) |
| .V( ) | MATCH(v0) |
| .values('age') | |
| .sum( ) | |

In the example Gremlin traversal shown in Table 2, the value that is being summed (as indicated by the .sum ( ) step) directly precedes it (that is, .values ('age')).

In one implementation of the transformation process, a transformation procedure programmed to translate a step is configured to take as arguments both the step itself and all steps that precede it, such that the step has access to an incoming object's path history.

Preprocessing Phase

Each step in a Gremlin traversal operates on input objects and produces output objects. Input objects and output objects of a Gremlin step are anonymous. In other words, input objects and output objects of a Gremlin step do not have names. However, clauses of a PGQL query refer to objects they operate on by name.

In an embodiment, during the preprocessing phase, names are assigned to input objects and output objects of steps in a Gremlin traversal. By assigning names before the translation phase, subsequent translation steps can assume the existence of valid names, making the translation considerably easier.

Translation Phase

The translation phase starts with an empty PGQL query and is expanded as steps of a Gremlin traversal are processed by traversing each of the steps, beginning from first step of the Gremlin traversal. Example empty PGQL query may include any one or more of the following empty SQL constructs: SELECT, WHERE, GROUP BY, ORDER BY, and MATCH. For example, an empty PGQL query includes one SELECT construct, one WHERE construct, one GROUP BY construct, one ORDER BY construct, and a MATCH construct. Additional SQL constructs may be dynamically added during the translation phase to the PGQL query.

The Gremlin traversal steps listed above can be grouped, for purposes of discussion, as one of the following: a graph step, a vertex step, a predicate step, an order step, a range step, an aggregate step, a match step, a nested step, or a math step.

Graph Step.

Every Gremlin traversal starts with a graph step on either vertices or edges: g.V( ) or g.E( ). In an embodiment, a graph step on vertices is processed by adding a path-pattern to a MATCH clause of the PGQL query: MATCH (v). Similarly, a graph step on edges is processed by adding a path-pattern to a MATCH clause of the PGQL query: MATCH ( )-[e]-> ( ).

A graph step can be parameterized with one or more identifiers of a vertex or edge (e.g. g.v(1), g.v(1, 2, 3), or g.E(42)). In addition to the path-pattern that is added to the MATCH clause, the parameterization causes a filter to be added to a WHERE clause of the PGQL query. For example, g.v(1) results in a partial PGQL query MATCH(v) WHERE ID(v)=1.

When a graph step is parameterized with multiple identifiers, a disjunction of filters is added to a WHERE clause. For example, g.V(1, 2, 3) results in a partial PGQL query MATCH(v) WHERE ID(v)=1 OR ID(v)=2 OR ID(v)=3.

Vertex Step.

A vertex step is a fundamental step in the Gremlin language. Via a vertex step, it is possible to "move" or traverse through a graph. Such a move takes place from a vertex to its neighbors or to its adjacent edges. In both cases or kinds of vertex step (e.g., a move to neighbors or a move to adjacent edges), the move can be performed on only incoming edges, only outgoing edges, or both incoming and outgoing edges. In addition, the move can be restricted to edges with a certain label.

In each case, a path-pattern is added to a MATCH clause of the PGQL query. Depending on the direction of the move, the path-pattern has one of the following forms:

If the direction is Gremlin's both (e.g., a move performed on both incoming and outgoing edges), then a path-pattern (_)-(_) is added to the MATCH clause.

If the direction is Gremlin's in (e.g., a move performed on an incoming edge), then a path-pattern (_)<-(_) is added to the MATCH clause.

If the direction is Gremlin's out (e.g., a move performed on an outgoing edge), then a path-pattern (_)->(_) is added to the MATCH clause.

The kind of vertex step (e.g., whether a move is to adjacent vertices or to adjacent edges) influences the variables in the path-pattern:

When moving to adjacent vertices, the edge is left anonymous or unnamed, but the opposite vertex is named. For example, if the direction is Gremlin's out, then this results in a path-pattern (_)->(v2).

When moving to adjacent edges, the opposite vertex is left anonymous or unnamed, but the edge is named. For example, if the direction is Gremlin's out, then this results in a path-pattern (_)-[e]->( ).

If a list of labels is non-empty, then the labels are added to the path-pattern. For example, when moving to all outgoing vertices that are a "friend" of the current vertices, then the path-pattern (_)-[: friend]->(v2) is generated.

Predicate Step.

Gremlin supports three kinds of predicate steps: a has step, an is step, and a where step. These predicate steps defer slightly in their semantics. For example, a has step filters an incoming object, whereas a where step filters an incoming object and also has access to the path history of the incoming object. In an embodiment, translation of these predicate steps to PGQL are treated similarly.

Table 3 shows, on the left, an example Gremlin traversal with a has step that filters the edges on those whose weight property is larger than 0.5 and, on the right, a corresponding equivalent PGQL query that is generated.

TABLE 3

| g | SELECT e |
|---|---|
| .E( ) | MATCH ( ) -e-> ( ) |
| .has('weight', gt(0.5)) | WHERE e.weight > 0.5 |

In the example shown in Table 3, the has step is parameterized with a predicate. In general, a predicate step can be parameterized with one or more predicate parameters and each predicate parameter contributes a filter expression to a WHERE clause of a PGQL query. If the predicate parameter is a predicate on the field (e.g., the weight field), then the path history is consulted to retrieve the identifier of the object whose property is being filtered on (e.g., edge e). These two pieces of information are brought together to form a property access e.weight in the PGQL query.

Other predicate translations are as follows:

Gremlin's and(_, _) is translated into a PGQL expression_AND_.

Gremlin's or(_, _) is translated into a PGQL expression_OR_.

Gremlin's lt(_) is translated into a PGQL expression_≤_.

Gremlin's lte(_) is translated into a PGQL expression_<=_.

Gremlin's gt(_) is translated into a PGQL expression_>_.

Gremlin's gte(_) is translated into a PGQL expression_>=_.

Gremlin's eq(_) is translated into a PGQL expression_=_.

Gremlin's neq(_) is translated into a PGQL expression NOT_.

Gremlin's within(_) is translated into a PGQL expression IN (_).

Gremlin's without(_) is translated into a PGQL expression NOT IN (_).

Gremlin's label.eq(_) is translated into a PGQL expression HAS_LABEL (_, _).

An exception to this translation is when an is step is preceded by an aggregation step. An aggregation step can be one of min, max, mean, sum, or count. In such a case, the filter expression is contributed to a HAVING clause instead of a WHERE clause of the partial PGQL query. The reason is that an aggregation step will contribute to a GROUP BY clause, and in PGQL, like in SQL, only a HAVING clause can filter on the result of an aggregation.

Order Step.

An order step sorts incoming objects by their value or some transformation of their value. An arbitrary number of comparators can be provided for the primary, the secondary, and any subsequent sorting. Table 4 shows, on the left, an example Gremlin traversal and, on the right, a corresponding equivalent PGQL query on the right that is generated.

TABLE 4

| g.V( ). | SELECT v.name |
|---|---|
| hasLabel('person'). | MATCH(v) |
| order( ). | ORDER BY (SELECT COUNT (e) |
| by(outE('created'). | MATCH (v) -[e]-> ( )) |
| count( ), asc). | ASC, v.age ASC |
| by('age', asc). | |
| values('name') | |

The example shows the Gremlin traversal that first sorts "person"-labeled vertices first by the number of outgoing "created"-labeled edges and then by the age property, and finally projects the name of those people on the left.

Each comparator is translated to a subquery that contributes to an ORDER BY clause in PGQL. Since comparators can be arbitrary Gremlin traversals, the transformation procedure is recursively invoked to translate those steps to a PGQL query. In the example shown in Table 4, the first comparator outE ('created').count ( ) is recursively translated into SELECT COUNT (e) MATCH (v)-[e]->( ). The second comparator is translated into SELECT v.age MATCH (v) which is later simplified to v.age in the post-processing phase, as described below.

The translation of the ordering is straightforward: Gremlin's asc is translated to PGQL's ASC and Gremlin's desc is translated to PGQL's DESC.

Range Step.

A range step allows only a certain number of objects through the traversal. A range step takes two parameters: a low-end value as the first parameter and a high-end value as the second parameter. When the low-end of the range is not met, objects are continued to be iterated. When within the range, objects are emitted. When above the high-end, the traversal breaks out of iteration. The use of −1 as the high-end value will emit objects after the low-end of the range begins.

Table 5 shows, on the left, an example Gremlin traversal with a range step and, on the right, a corresponding equivalent PGQL query that is generated.

TABLE 5

| g.V( ) | SELECT v.age |
|---|---|
| .values('age') | MATCH(v) |
| .order( ) | ORDER BY v.age ASC |
| .range(2, 4) | LIMIT 4 |
| | OFFSET 2 |

A range step contributes to LIMIT and OFFSET clauses of the PGQL query. In an embodiment, if the low-end of the range step is greater than zero, then an OFFSET clause with the value of the low-end is added to a partial PGQL query. In an embodiment, if the high-end of the range step is greater than or equal to zero, then a LIMIT clause with the value of the high-end is added to the partial PGQL query.

A range step is a generalization of a skip step and a limit step. For example, a skip step with the parameter 2 is the same as a range step with a low-end of 2 and a high-end of −1. For brevity, discussion regarding the translation of the skip step and limit step is thus omitted from herein.

Aggregate Step.

A groupCount step groups incoming objects and outputs a mapping from an object to the number of times that object occurred (e.g., its count). The groupCount step may transform the object that is being grouped on into a property of that object.

A groupCount step in a Gremlin traversal is translated to a GROUP BY clause in a partial PGQL query. If the groupCount step operates on an incoming object, then the name of this object is used to group by in the PGQL query. If the groupCount step groups on a property p of the incoming object, then the clause GROUP BY x.p is added to the partial PGQL query. The history is consulted to retrieve x (e.g., the name of the object whose property is being grouped upon).

Match Step. A match step is parameterized with one or more patterns. Since patterns of a match step are traversals themselves, the transformation procedure for transforming the steps is invoked recursively. Table 6 shows, on the left, an example Gremlin traversal using a match step and, on the right, a corresponding equivalent PGQL query that is generated. Both queries select the name of all vertices b that are known by some vertex a that created another vertex c.

TABLE 6

| g.V( ).match( | SELECT b.name |
|---|---|
| as("a").out("knows").as("b"), | MATCH (a) −[:knows]−> (b), |
| as("a").out("created").as("c"), | (a) −[:created]−> (c) |
| ).select("b").by("name"). | |

In the example shown in Table 6, the pattern as ("a").out ("knows").as("b") contributes the path pattern (v0)-[:knows]->(v1), and the path pattern as ("a").out("created") .as("c") contributes the path pattern (v0)-[: created]->(v2).

Nested Step.

A and step, or step, not step, and where step are all parameterized by one or more traversals, each may correspond to a sub-step. Table 7 shows, on the left, an example Gremlin traversal with a and step that is parameterized by two nested traversals and, on the right, a corresponding equivalent PGQL query that is generated.

TABLE 7

| g.V( ).and( | SELECT v0.name |
|---|---|
| outE('knows'), | MATCH (v0) |
| values('age') | WHERE EXISTS |
| .is(lt(30)) | (SELECT v1 |
| ).values('name') | MATCH (v0) − |
| | [v1:knows]−> ( )) |
| | AND EXISTS |
| | (SELECT v0.age |
| | MATCH (v0) |
| | WHERE v0.age < |
| | 30) |

To translate a nested step that is parameterized by one or more traversals $t_1, t_2, \ldots, t_n$, first the traversal parameters $t_1, t_2, \ldots, t_n$ are translated to PGQL queries $q_1, q_2, \ldots, q_n$ by recursively invoking the transformation procedure. Each generated PGQL query $q_i$ is wrapped in an EXISTS predicate. Depending on the nested step, the translation is as follows:

For a and step, the generated EXISTS predicates are added to a WHERE clause of a partial PGQL query.

For an or step, the generated EXISTS predicates are joined together by OR predicates and added to a WHERE clause of a partial PGQL query.

For a not step, the generated EXISTS predicate is wrapped in a NOT predicate and added to a WHERE clause of a partial PGQL query.

For a where step, the generated EXISTS predicate is added to a WHERE clause of a partial PGQL query.

Math Step.

A math step enables scientific calculator functionality within Gremlin. A math step is parameterized by a mathematical expression. Variables in this expression can refer to bound elements. A reserved variable _ is used to refer to an incoming object. Variables can optionally be transformed before entering a math step by adding by-modulators. A by-modulator is an arbitrary Gremlin traversal. Table 8 shows, on the left, an example Gremlin traversal with a math step and, on the right, a corresponding equivalent PGQL query that is generated. This traversal computes for each vertex a that "created" some other vertex b the sum of a's age and the degree of b.

TABLE 8

| g.V( ).as('a'). | SELECT (SELECT COUNT(v2) |
|---|---|
| out('created').as('b'). | MATCH (v1) − (v2) |
| math('b + a'). | ) + v0.age |
| by(both( ).count( )). | MATCH (v0) −[:created]−> (v1) |
| by('age') | |

In an embodiment, a math step is transformed to PGQL by parsing the mathematical expression into an abstract syntax tree and transforming this tree to a PGQL expression. If a variable in the math step are transformed (using by-modulation steps, as in the example above), then the variable is replaced by a scalar subquery in PGQL. The mathematical operators are transformed in a straightforward manner. In particular, addition, subtraction, multiplication, division, and modulo translate to the corresponding operator in PGQL. The reserved variable _ is transformed into the name of the incoming object.

Gremlin's built-in mathematical functions that are also supported by PGQL (abs, ceil, floor) are transformed into calls to those functions. All other mathematical functions are translated into calls to a user-defined function (UDF).

Post-Processing Phase

After the translation phase is completed, a PGQL query is translated from a Gremlin traversal, and the transformation process enters a post-processing phase. The post-processing phase normalizes the PGQL query.

In an embodiment, a Gremlin traversal that contains one or more nested traversals is translated to a PGQL query that contains one or more subqueries. When a subquery uses only variables that are already bound in the main query, the subquery may be inlined. For example, SELECT (SELECT v.name MATCH (v)) MATCH (v) WHERE v.age>12 may be normalized to SELECT v.name MATCH (v) WHERE v.age>12 because (v) in the subquery is already bound in the main query.

A transformation may have used the same edge variable twice. For example, in MATCH (v1)-[e1]->, ( )<-[e1]-(v2), the variable e1 is used in both the forward edge and backward edge. However, PGQL does not allow an edge variable to occur twice. To solve this problem, each occurrence of the edge variable is replaced by a new edge variable and an equality predicate is added to the WHERE clause. In this example, during the post-processing phase, the MATCH clause becomes (v1)-[e2]->( ), ( )<-[e3]-(v2) and the WHERE clause becomes WHERE e2=e3.

Example Transformation Method

Figure 3A:
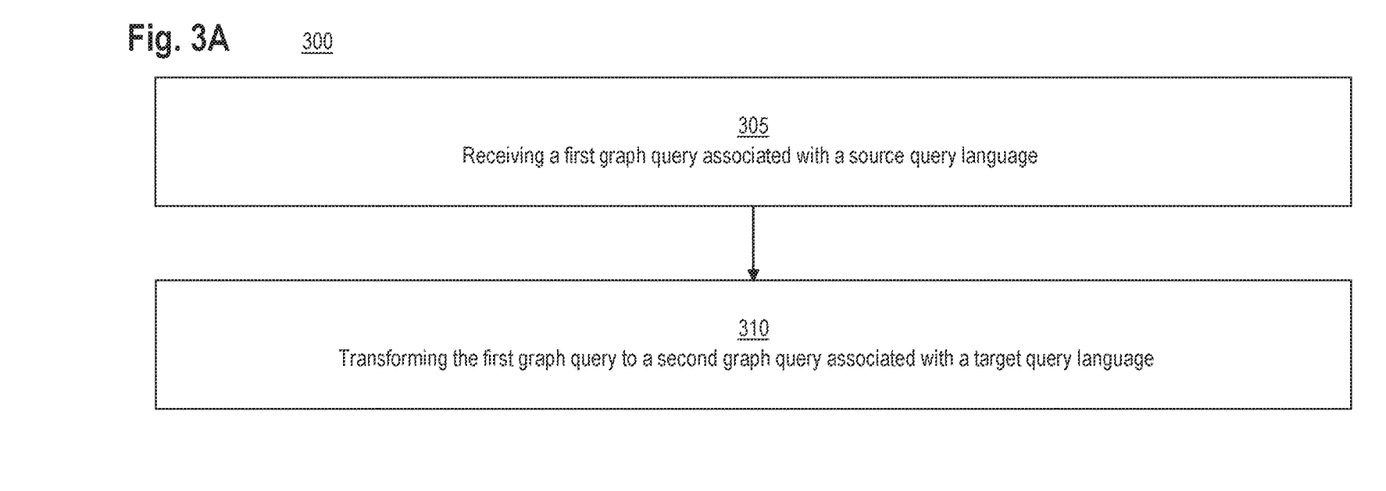
FIGS. 3A-3B illustrate an example flow diagram that depicts a method of transforming graph query from a query language to another query language inside a relational database system.
Figure 3B:
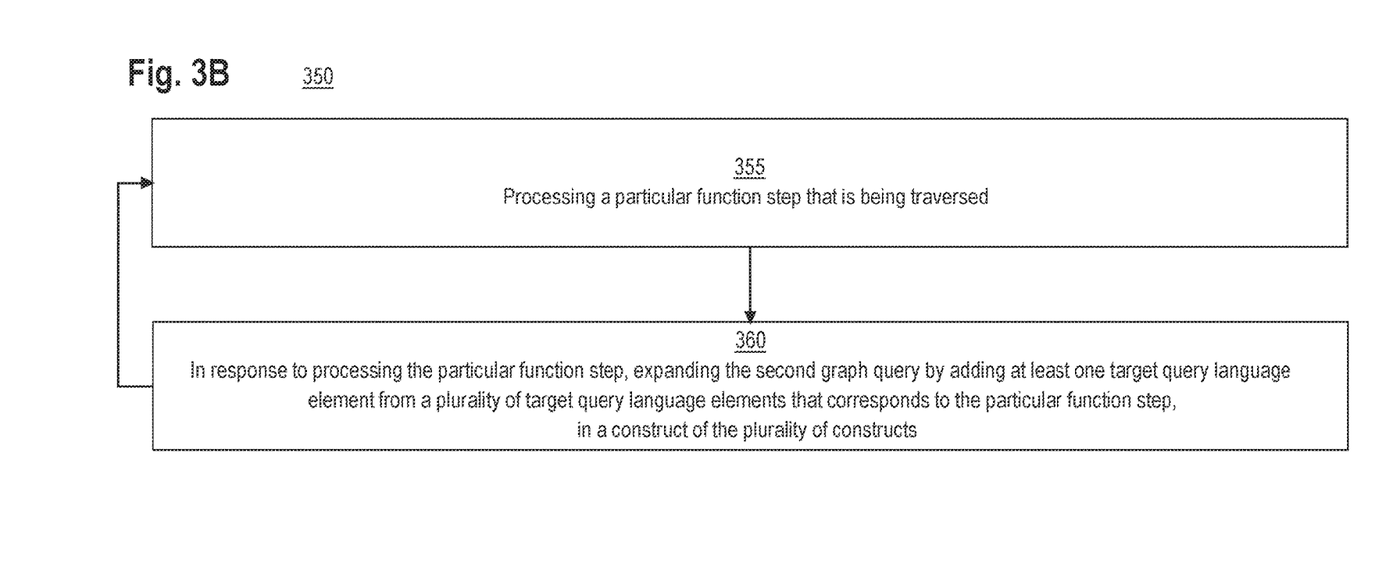

FIGS. 3A-3B illustrate an example flow diagram that depicts a method of transforming graph query from a query language to another query language inside a relational database system.

Referring to FIG. 3A, at step 305, a graph engine receives a first graph query associated with a source query language. The graph engine uses the target query language to query graphs. Syntax of the first graph query comprises a sequence of functions steps. An output of a first function step in the sequence of function steps is an input to a second function step in the sequence of functions steps immediately following the first function step in the sequence of function steps.

For example, the graph engine is PGX and the first graph query is a Gremlin traversal. PGX uses PQGL to query graphs. The Gremlin traversal is composed of a sequence of steps. Each step is denoted by a separating dot. Each step performs an atomic operation or function on a data stream that includes one or more objects emitted or output from a previous step.

At step 310, the graph engine transforms the first graph query associated with the source query to a second graph query associated with a target query language. In an embodiment, the graph engine may transform the first graph query to the second graph query in response to determining that the first graph query is syntactically valid according to the source query language.

For example, the second graph query is a PGQL query. PGX may first determine whether or not the Gremlin traversal is syntactically valid. If it is determined that the Gremlin traversal is not syntactically valid, then PGX may generate an alert or error and may not proceed with the transformation of the Gremlin traversal to the PGQL query. If it is determined that the Gremlin traversal is syntactically valid, then PGX continues with the transformation Gremlin traversal to the PGQL query.

An example transformation process 350 performed at step 310 is depicted in FIG. 3B. In some embodiment, the transformation process may include a preprocessing phase, translation phase, and postprocessing phase.

During the preprocessing phase, unique identifiers are assigned to each input and output objects of all function steps in the sequence of functions steps of the first graph query. For example, since input objects and output objects of a Gremlin step do not have names but PGQL clauses refer to objects they operate on by name, names are assigned to input objects and output objects of steps in the Gremlin traversal.

During the translation phase, the second query is translated from first graph query. The second query is translated by, starting from the beginning of the sequence of function steps of the first graph query, traversing the sequence of function steps.

In an embodiment, prior to traversing the sequence of function steps of the first graph query, the second graph query is an empty query that comprises a plurality of constructs that are empty. The plurality of constructs may include a SELECT clause, a FROM clause, a WHERE clause, a GROUP BY clause, a HAVING clause, an ORDER BY clause, a MATCH clause, a LIMIT clause, and an OFFSET clause. The plurality of constructs is expanded as each function step is processed.

Referring to FIG. 3B, at step 350, a particular function step that is being traversed is processed. In an embodiment, processing the particular function step may include recursively back-traversing from the particular function step to a function step that provides a unique identifier of an object whose property is being inquired by the particular function step, and in response, obtaining the unique identifier of the object. Back-traversing from the particular function step accesses a path history of the object to retrieve the unique identifier of the object whose property is being inquired by the particular function step.

For example, in the Gremlin traversal shown in Table 3, the has step is parameterized with a predicate (e.g., .has ('weight', gt(0.5)) ). The history of an incoming object can be consulted, by back-traversing from the has step to a preceding step, such as the graph step (e.g., g.E( )) in the example, in order to retrieve the name of the object (e.g., edge e) whose property (e.g., weight property larger than 0.5) is being filtered on by the has step.

At step 355, in response to processing the particular function step, the second graph query is expanded by adding at least one target query language element from a plurality of target query language elements that corresponds to the particular function step, in a construct of the plurality of constructs. The at least one target query language function references the obtained unique identifier. The plurality of target query language elements may include a path-pattern, a filter, and a label.

For example, the predicate parameter of the has step in the Gremlin traversal shown in Table 3, corresponds to a filter expression. The filter expression uses the retrieved name of the object (e.g., e) and is added to a WHERE clause in the PGQL query (e.g., WHERE e.weight>0.5).

In an embodiment, the particular function step contains a sequence of sub-function steps. The sequence of sub-function steps is processed prior to continuing traversal of the sequence of function steps. For example, the Gremlin traversal includes a step that is nested. The nested step is parameterized with one or more sub-steps. Each of the sub-steps of the nested step is recursively translated prior to traversing to the next step in the Gremlin traversal for translation.

Step 350 and step 355 are repeated for each function step in the sequence of function steps traversed. After all the function steps in the sequence of the function steps are translated, the transformation process enters the postprocessing phase. During the postprocessing phase, the second query generated by the translation phase is normalized.

In an embodiment, after the first graph query is transformed to the second graph query, a result of the second graph query against one or more of the graphs is computed. A format of the result is transformed to a format expected by the source query language. The transformed result is returned to a customer.

For example, PGX is used to compute the result of the PGQL query. The result of the PGWL query is transformed into a Gremlin result set. The Gremlin result set is returned to a user.

Benefits and Advantages

Techniques described herein automatically transforms Gremlin queries to PGQL queries and automatically transforms PGQL result sets back to Gremlin result sets. These techniques enable the use of the existing PGQL interpreter and optimizer to support Gremlin workloads without reimplementing this infrastructure for Gremlin. Customers are able to write graph queries in the language of their preference: Gremlin or PGQL. In addition, customers are able to use a Gremlin-enabled graph engine to migrate to PGX without having to rewrite all of their graph queries.

Techniques described herein are applicable to any system that performs graph analysis. For example, neo4j has implemented support for their main language Cypher as well as Gremlin. Similarly, TigerGraph has implemented support for their main language GSQL as well as Gremlin. By being able to translate Gremlin queries to the another language, a graph engine vendor can add support for Gremlin without implementing a separate interpreter for Gremlin. Techniques described herein may be used for translating other graph languages that, like Gremlin, use a delimited sequence of functions to specify graph query operations into another language that uses keyword-based clauses for projection (e.g., SELECT clause), predicate conditions (e.g., WHERE clause), sorting (e.g., ORDER BY clause), grouping and aggregation (e.g., GROUPING BY clause).

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, each representing a plan operator or row sources. The hierarchy of the graphs (i.e., directed tree) represents the order in which the execution plan operators are performed and how data flows between each of the execution plan operators.

An operator, as the term is used herein, comprises one or more routines or functions that are configured for performing operations on input rows or tuples to generate an output set of rows or tuples. The operations may use interim data structures. Output set of rows or tuples may be used as input rows or tuples for a parent operator.

An operator may be executed by one or more computer processes or threads. Referring to an operator as performing an operation means that a process or thread executing functions or routines of an operator are performing the operation.

A row source performs operations on input rows and generates output rows, which may serve as input to another row source. The output rows may be new rows, and or a version of the input rows that have been transformed by the row source.

A match operator of a path pattern expression performs operations on a set of input matching vertices and generates a set of output matching vertices, which may serve as input to another match operator in the path pattern expression. The match operator performs logic over multiple vertex/edges to generate the set of output matching vertices for a specific hop of a target pattern corresponding to the path pattern expression.

An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
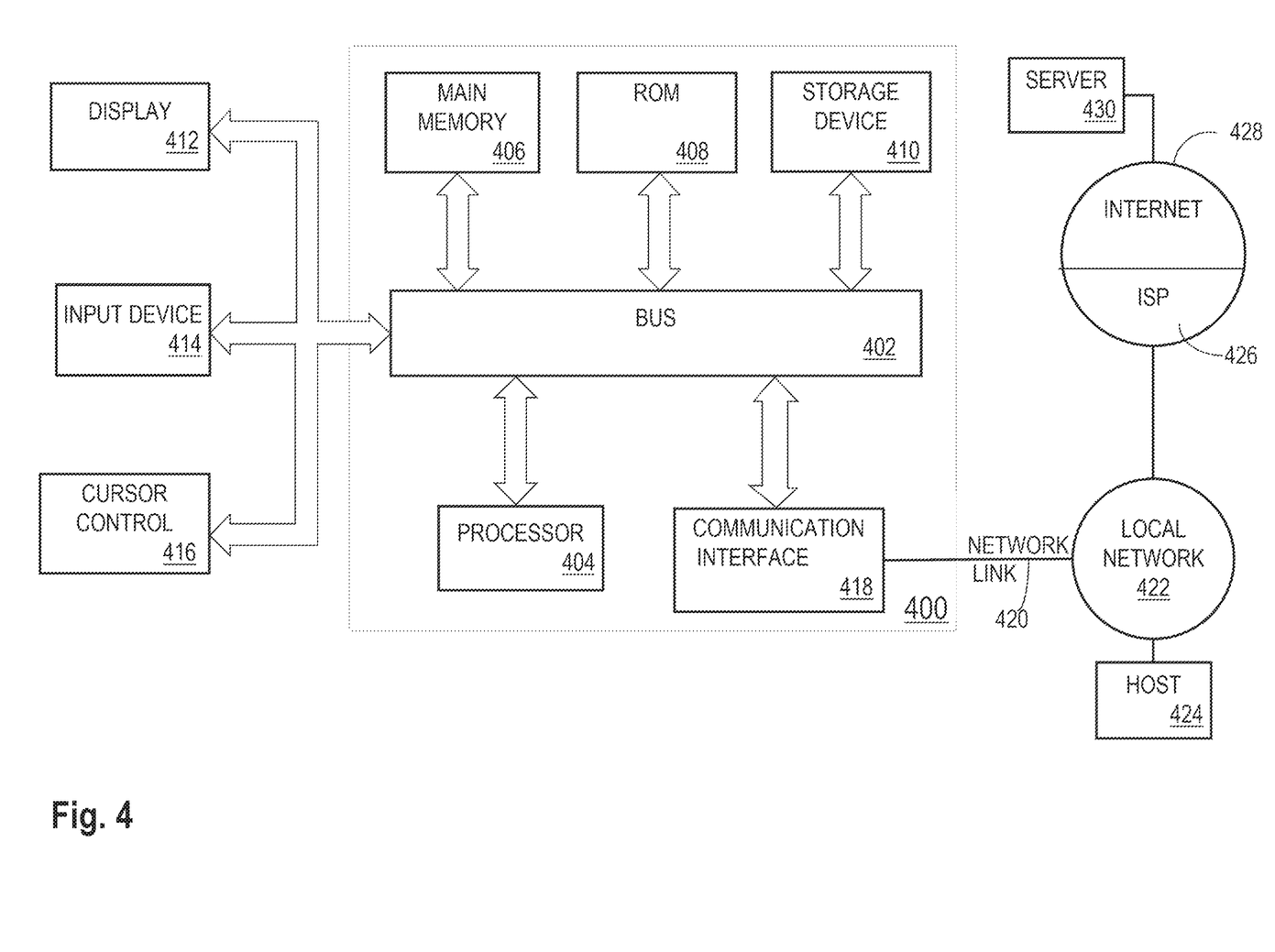
FIG. 4 illustrates a block diagram of a computing device in which the example embodiment(s) of the present invention may be embodiment.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
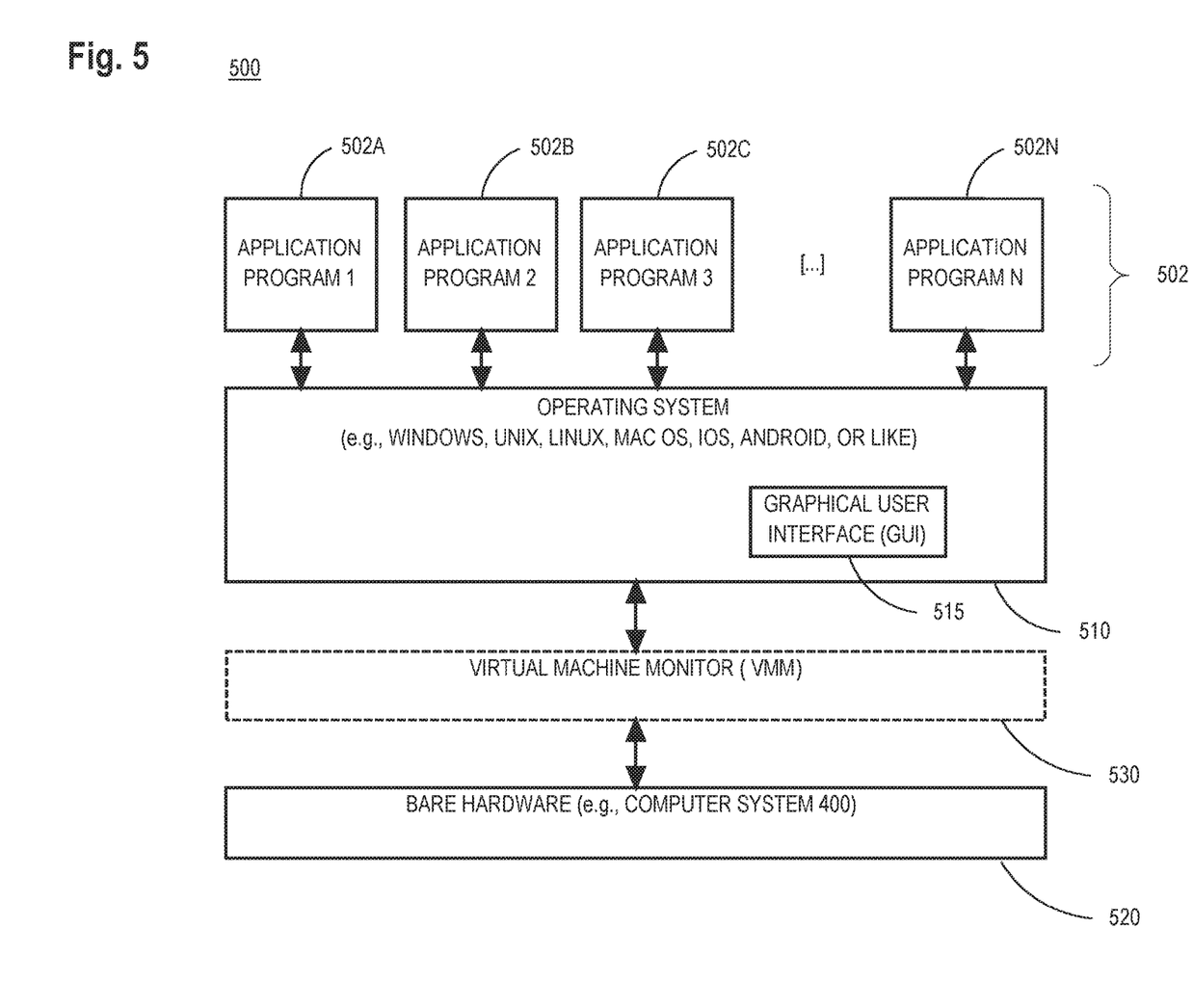
FIG. 5 illustrates a block diagram of a basic software system for controlling the operation of a computing device.

FIG. 5 is a block diagram of a software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 400. The applications or other software intended for use on system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of system 500. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation. In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
a graph engine receiving a first graph query associated with a source query language and transforming the first graph query to a second graph query associated with a target query language;
wherein the graph engine uses the target query language to query graphs;
wherein syntax of the first graph query comprises a sequence of function steps;
wherein an output of a first function step in the sequence of function steps is an input to a second function step in the sequence of function steps immediately following the first function step in the sequence of function steps;
wherein, prior to traversing the sequence of function steps of the first graph query, the second graph query comprising a plurality of constructs that are empty; and
wherein transforming the first graph query to the second graph query comprises:
starting from a beginning of the sequence of function steps of the first graph query, said traversing the sequence of function steps;
for said first function step once traversed during said traversing,
expanding the second graph query by adding a construct of said plurality of constructs that corresponds to said first function step, and
for said second function step once traversed during said traversing, adding in a construct of the plurality of constructs at least one target query language element from a plurality of target query language elements, wherein said at least one target query language element corresponds to said second function step.

2. The method of claim 1, further comprising determining that the first graph query is syntactically valid according to the source query language, and wherein transforming the first graph query is in response to the determination that the first graph query is syntactically valid according to the source query language.

3. The method of claim 1, wherein the plurality of target query language elements includes a path-pattern, a filter, and a label.

4. The method of claim 1, wherein the plurality of constructs includes a SELECT clause, a FROM clause, a WHERE clause, a GROUP BY clause, a HAVING clause, an ORDER BY clause, a MATCH clause, a LIMIT clause, and an OFFSET clause.

5. The method of claim 1, wherein transforming the first graph query to the second graph query comprises recursively back-traversing from the second function step to a function step that provides a unique identifier of an object whose property is being inquired by the second function step, and in response, obtaining the unique identifier of the object.

6. The method of claim 5, wherein the at least one target query language element references the unique identifier.

7. The method of claim 1, wherein the first function step contains a sequence of sub-function steps, wherein the sequence of sub-function steps is processed prior to continuing traversal of the sequence of function steps.

8. The method of claim 1, wherein transforming the first graph query to the second graph query further comprises, prior to traversing the sequence of function steps, assigning a unique identifier to each input and output objects of all function steps in the sequence of function steps of the first graph query.

9. The method of claim 1, wherein transforming the first graph query to the second graph query further comprises normalizing the second graph query.

10. The method of claim 1, further comprising, after transforming the first graph query to the second graph query:
computing a result of the second graph query against one or more of the graphs; and
transforming a format of the result to a format expected by with the source query language.

11. One or more non-transitory storage media storing sequences of instructions which, when executed by one or more processors, cause:
a graph engine receiving a first graph query associated with a source query language and transforming the first graph query to a second graph query associated with a target query language;
wherein the graph engine uses the target query language to query graphs;
wherein syntax of the first graph query comprises a sequence of function steps;
wherein an output of a first function step in the sequence of function steps is an input to a second function step in the sequence of function steps immediately following the first function step in the sequence of function steps;
wherein, prior to traversing the sequence of function steps of the first graph query, the second graph query comprising a plurality of constructs that are empty; and
wherein transforming the first graph query to the second graph query comprises:
starting from a beginning of the sequence of function steps of the first graph query, said traversing the sequence of function steps;
for said first function step once traversed during said traversing, expanding the second graph query by adding a construct of said plurality of constructs that corresponds to said first function step, and
for said second function step once traversed during said traversing, adding in a construct of the plurality of constructs at least one target query language element from a plurality of target query language elements, wherein said at least one target query language element corresponds to said second function step.

12. The one or more non-transitory computer-readable storage media of claim 11, wherein the sequences of instructions which, when executed by the one or more processors, further cause determining that the first graph query is syntactically valid according to the source query language, and wherein transforming the first graph query is in response to the determination that the first graph query is syntactically valid according to the source query language.

13. The one or more non-transitory computer-readable storage media of claim 11, wherein the plurality of target query language elements includes a path-pattern, a filter, and a label.

14. The one or more non-transitory computer-readable storage media of claim 11, wherein the plurality of constructs includes a SELECT clause, a FROM clause, a WHERE clause, a GROUP BY clause, a HAVING clause, an ORDER BY clause, a MATCH clause, a LIMIT clause, and an OFFSET clause.

15. The one or more non-transitory computer-readable storage media of claim 11, wherein transforming the first graph query to the second graph query comprises recursively back-traversing from the second function step to a function step that provides a unique identifier of an object whose property is being inquired by the second function step, and in response, obtaining the unique identifier of the object.

16. The one or more non-transitory computer-readable storage media of claim 15, wherein the at least one target query language element references the unique identifier.

17. The one or more non-transitory computer-readable storage media of claim 11, wherein the first function step contains a sequence of sub-function steps, wherein the sequence of sub-function steps is processed prior to continuing traversal of the sequence of function steps.

18. The one or more non-transitory computer-readable storage media of claim 11, wherein transforming the first graph query to the second graph query further comprises, prior to traversing the sequence of function steps, assigning a unique identifier to each input and output objects of all function steps in the sequence of function steps of the first graph query.

19. The one or more non-transitory computer-readable storage media of claim 11, wherein transforming the first graph query to the second graph query further comprises normalizing the second graph query.

20. The one or more non-transitory computer-readable storage media of claim 11, wherein the sequences of instructions which, when executed by the one or more processors, cause; after transforming the first graph query to the second graph query:
    computing a result of the second graph query against one or more of the graphs; and
    transforming a format of the result to a format expected by with the source query language.

* * * * *

UNITED STATES PATENT AND TRADEMARK OFFICE
CERTIFICATE OF CORRECTION

PATENT NO. : 11,537,609 B2
APPLICATION NO. : 16/917621
DATED : December 27, 2022
INVENTOR(S) : Dwars et al.

Page 1 of 1

It is certified that error appears in the above-identified patent and that said Letters Patent is hereby corrected as shown below:

On the Title Page

Column 1, under Applicant, Line 1, delete "Corporation" and insert -- Corporation, Redwood Shores, CA (US) --, therefor.

Column 2, under Other Publications, Line 1, delete ""Turorials:" and insert -- "Tutorials: --, therefor.

Column 2, under Abstract, Line 8, delete "function-based-based" and insert -- function-step-based --, therefor.

On page 2, Column 2, under Other Publications, Line 9, delete "Germlin" and insert -- Gremlin --, therefor.

In the Specification

In Column 3, Line 55, delete "graph" and insert -- graph. --, therefor.

In Column 6, Line 16, delete "expression_≤_." and insert -- expression_<_. --, therefor.

In Column 9, Line 30, delete "(v1)-[e1]->," and insert -- (v1)-[e1]->(), --, therefor.

In Column 9, Line 55, delete "PQGL" and insert -- PGQL --, therefor.

In Column 11, Line 25, delete "PGWL" and insert -- PGQL --, therefor.

In Column 16, Line 8, delete "and or" and insert -- and/or --, therefor.

In the Claims

In Column 20, Line 22, in Claim 20, delete "cause;" and insert -- cause: --, therefor.

Signed and Sealed this
Twenty-fourth Day of October, 2023

Katherine Kelly Vidal
*Director of the United States Patent and Trademark Office*